(12) United States Patent
Park et al.

(10) Patent No.: US 7,605,014 B2
(45) Date of Patent: Oct. 20, 2009

(54) METHOD OF FABRICATING RESISTIVE PROBE HAVING SELF-ALIGNED METAL SHIELD

(75) Inventors: Hong-sik Park, Seoul (KR); Ju-hwan Jung, Seoul (KR); Hyoung-soo Ko, Seoul (KR); Seung-bum Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 537 days.

(21) Appl. No.: 11/498,095

(22) Filed: Aug. 3, 2006

(65) Prior Publication Data
US 2007/0042522 A1 Feb. 22, 2007

(30) Foreign Application Priority Data
Aug. 17, 2005 (KR) .................. 10-2005-0075250

(51) Int. Cl.
*H01L 21/00* (2006.01)
(52) U.S. Cl. .............. 438/52; 438/11; 438/13; 438/14; 438/E21.577
(58) Field of Classification Search ........... 438/11–18, 438/48–52; 257/48, 492
See application file for complete search history.

(56) References Cited

U.S. PATENT DOCUMENTS

| 6,703,258 B2 * | 3/2004 | Hopson et al. ............. 438/52 |
| 2003/0012930 A1 * | 1/2003 | Brousseau, III ............ 428/173 |

FOREIGN PATENT DOCUMENTS

| JP | 5-339731 A | 12/1993 |
| JP | 10-332714 A | 12/1998 |
| JP | 11-121961 A | 4/1999 |
| JP | 2002-72897 A | 3/2002 |
| JP | 2003-34828 A | 2/2003 |
| WO | WO 03/096409 A1 | 11/2003 |

* cited by examiner

*Primary Examiner*—Dung A. Le
(74) *Attorney, Agent, or Firm*—Sughrue Mion, PLLC

(57) ABSTRACT

A method of fabricating a resistive probe having a self-aligned metal shield. The method includes sequentially forming a first insulating layer, a metal shield, and a second insulating layer on a resistive tip of a substrate; etching the second insulating layer to expose the metal shield on a resistive region; etching the exposed metal shield; and etching the first insulating layer to expose the resistive region.

10 Claims, 10 Drawing Sheets

METHOD OF FABRICATING RESISTIVE PROBE HAVING SELF-ALIGNED METAL SHIELD

CROSS-REFERENCE TO RELATED PATENT APPLICATION

This application claims priority from Korean Patent Application No. 10-2005-0075250, filed on Aug. 17, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to fabricating a resistive probe having a self-aligned metal shield, and more particularly, to fabricating a resistive probe having a metal shield whose aperture is self-aligned with a resistive region.

2. Description of the Related Art

As compact products, such as mobile communication terminals and electronic pocket notes, become more popular, the demand for micro integrated nonvolatile recording media increases. However, it is not easy to downsize existing hard disks nor to highly integrate flash memories. Therefore, information storage devices using scanning probe microscopy (SPM) have been studied as an alternative.

Probes are used in various SPM techniques. For example, probes are used for a scanning tunneling microscope (STM) that detects current produced when voltage is applied between a probe and a sample to reproduce information, an atomic force microscope (AFM) that uses an atomic force between a probe and a sample, a magnetic force microscope (MFM) that uses an interaction force between a magnetic field produced by a sample and a magnetized probe, a scanning near-field optical microscope (SNOM) that overcomes a resolution limitation due to the wavelength of visible light, and an electrostatic force microscope (EFM) that uses an electrostatic force between a sample and a probe.

In order to record and reproduce information at high speed and density using such SPM techniques, a surface charge in a small area of several tens of nanometers in diameter should be detected. Also, cantilevers should be in the form of an array to increase recording and reproduction speeds.

FIG. 1 is a cross-sectional view of a cantilever 70 with a resistive tip 50, which is disclosed in International Patent Publication No. WO 03/096409. The resistive tip 50 is formed to be perpendicular to the cantilever 70 and the cantilevers 70 can be fabricated in the form of an array to have a resistive region 56 of several tens of nanometers in diameter.

Referring to FIG. 1, the resistive tip 50 of the semiconductor probe includes a body 58 doped with a first impurity, the resistive region 56 disposed at a peak of the resistive tip 50 and lightly doped with a second impurity, and first and second semiconductor electrode regions 52 and 54 formed on inclined surfaces of the resistive tip 50 with the resistive region 56 therebetween and heavily doped with the second impurity.

However, the related art semiconductor probe with the resistive tip 50 has a disadvantage in that the first and second semiconductor electrode regions 52 and 54 formed on the inclined surfaces of the resistive tip 50 are excessively wet-etched during a process of forming the resistive tip 50, thereby reducing the areas of the heavily doped inclined surfaces. Conductive areas on the inclined surfaces are accordingly reduced, thereby degrading the spatial resolution of the resistive region 56.

The spatial resolution of the semiconductor probe can be improved by forming a metal shield on a portion other than the resistive region 56. However, it is not easy to align a metal shield having an aperture of 100 nm in diameter with the resistive region 56 to expose the resistive region 56.

SUMMARY OF THE INVENTION

The present invention provides a method of easily aligning an aperture of a metal shield with a resistive region.

According to an aspect of the present invention, there is provided a method of fabricating a resistive probe having a self-aligned metal shield, the method comprising forming a resistive tip on a substrate that is doped with a first impurity, the resistive tip comprising a resistive region formed at a peak thereof and lightly doped with a second impurity, which is opposite in polarity to the first impurity, and first and second semiconductor electrode regions formed on inclined surfaces thereof and heavily doped with the second impurity; sequentially forming a first insulating layer and a metal shield on the resistive tip; uniformly forming a second insulating layer to cover the metal shield; etching the second insulating layer to expose the metal shield on the resistive region; etching the exposed metal shield; and etching the first insulating layer to expose the resistive region.

The uniformly forming of the second insulating layer may comprise depositing the second insulating layer using a plasma enhanced chemical vaporized deposition (PE-CVD) method.

The uniformly forming of the second insulating layer may comprise depositing the second insulating layer at a temperature of 400° C. or less.

The etching of the second insulating layer may comprise anisotropically etching the second insulating layer from a position over the second insulating layer such that the second insulating layer remains on the inclined surfaces.

The forming of the resistive tip on the substrate may comprise forming a stripe-shaped mask layer on a top surface of the substrate that is doped with the first impurity, and heavily doping a portion of the substrate not covered by the mask layer with the second impurity, which is opposite in polarity to the first impurity, to form the first and second semiconductor electrode regions; annealing the substrate to reduce a distance between the first and second semiconductor electrode regions, and forming a resistive region, which is lightly doped with the second impurity, along outer boundaries of the first and second semiconductor electrode regions; and patterning the mask layer into a predetermined shape and forming a resistive tip by etching the top surface of the substrate except the patterned mask layer.

The forming of the resistive region may comprise forming a peak forming portion by allowing the resistive region diffused from the first and second semiconductor electrode regions to contact each other.

The patterning of the mask layer may comprise forming a stripe-shaped photoresist perpendicularly to the mask layer, and performing an etching process to make the mask layer into a rectangular shape.

The forming of the resistive tip may comprise forming an oxide layer with a predetermined thickness on the surface of the substrate by annealing the substrate under an oxygen atmosphere after removing the patterned mask layer; and removing the oxide layer to sharpen ends of the resistive regions.

The forming of the oxide layer may comprise forming a peak forming portion by allowing the resistive regions diffused from the first and second semiconductor electrode regions to contact each other on the substrate.

The first impurity may be a p-type impurity, and the second impurity may be an n-type impurity.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS

Figure 1:
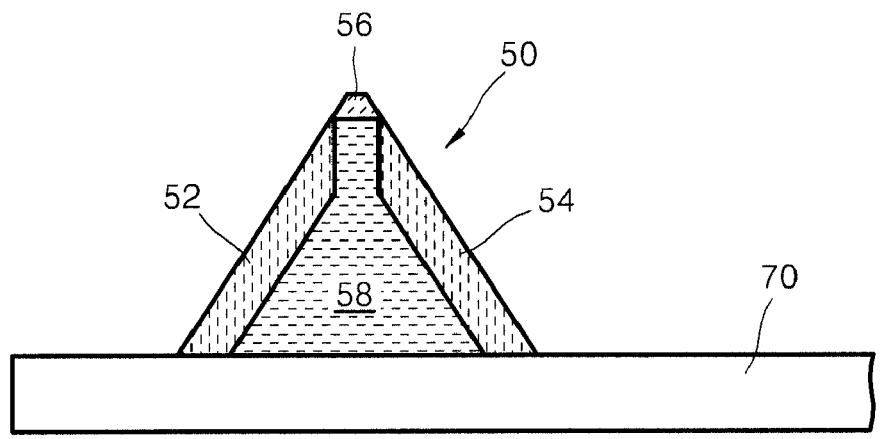
FIG. 1 is a cross-sectional view of a cantilever with a resistive tip, which is disclosed in International Patent Publication No. WO 03/096409.

The present invention will now be described more fully with reference to the accompanying drawings, in which exemplary embodiments of the invention are shown. The thickness of layers or regions illustrated in the drawings is exaggerated for clarity.

Figure 2:
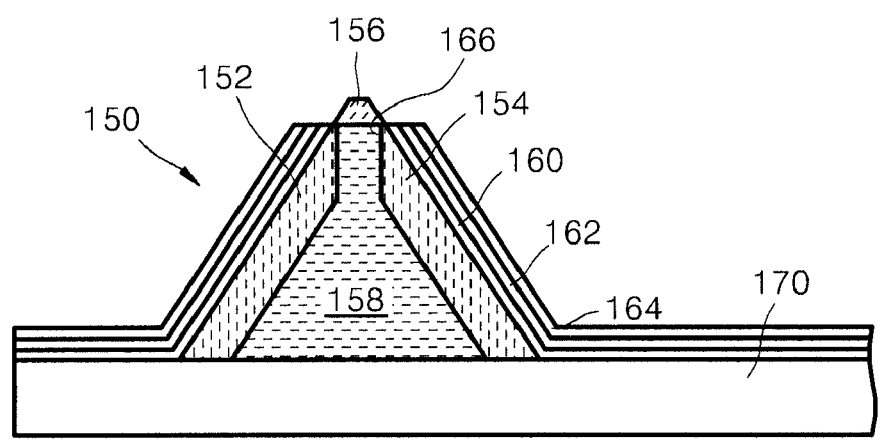
FIG. 2 is a cross-sectional view of a tip portion of a resistive probe having a self-aligned metal shield according to an exemplary embodiment of the present invention.

FIG. 2 is a cross-sectional view of a tip portion of a resistive probe having a self-aligned metal shield according to an exemplary embodiment of the present invention.

Referring to FIG. 2, a tip 150 of the semiconductor probe extends perpendicularly from an end of a cantilever 170. The tip 150 includes a body 158 doped with a first impurity, a resistive region 156 formed at a peak of the tip 150 and lightly doped with a second impurity, which is opposite in polarity to the first impurity, and first and second semiconductor electrode regions 152 and 154 formed on inclined surfaces of the tip 150 with the resistive region 156 therebetween and heavily doped with the second impurity. The first impurity may be a p-type impurity, and the second impurity may be an n-type impurity. A first insulating layer 160 is formed on the first and second semiconductor electrode regions 152 and 154 and the cantilever 170, and a metal shield 162 is formed on the first insulating layer 160 along the inclined surfaces of the tip 150. The first insulating layer 160 may be made of $SiO_2$ or $Si_3N_4$. The metal shield 162 may be made of Al or Au.

A second insulating layer 164 may be formed on the metal shield 162. The second insulating layer 164 may remain on or may be completely removed from the metal shield 162 in a subsequent etching process.

An aperture 166 for exposing the resistive region 156 is formed in the first insulating layer 160, the metal shield 162, and the second insulating layer 164. The metal shield 162 prevents an electric field induced by a surface charge of a recording medium from affecting portions other than the resistive region 156, that is, the first and second semiconductor electrode regions 152 and 154. Accordingly, the electric field induced by the surface charge varies a resistance of the resistive region 156, and the polarity and density of the surface charge can be accurately detected from the variation in the resistance.

Figure 3:
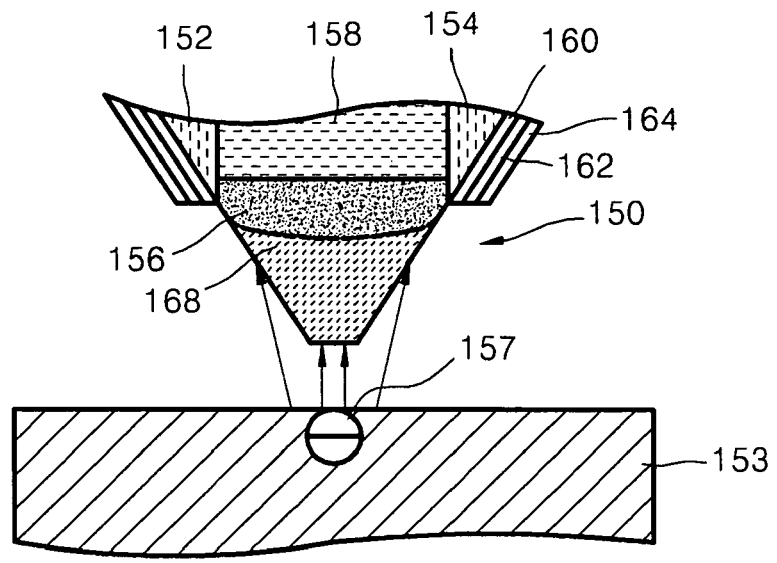
FIG. 3 is an enlarged view of a peak of the tip portion of the resistive probe of FIG. 2.

FIG. 3 is an enlarged view of the peak of the tip 150 of the semiconductor probe of FIG. 2.

The operation of the resistive probe having the self-aligned metal shield 162 will be explained with reference to FIG. 3.

Even if a depletion region 168 does not expand up to the first and second semiconductor electrode regions 152 and 154, an area of the resistive region 156 is reduced due to the depletion region 168, which is a non-conductor, thereby varying the resistance of the resistive region 156. Accordingly, the polarity and density of a surface charge 157 of a recording medium 153 can be detected from the resistance variation. It can be seen in FIG. 3 that the depletion region 168 formed in the resistive region 156 expands toward the first and second semiconductor electrode regions 152 and 154 due to the electric field induced by the negative surface charge 157. In particular, the regions of the resistive tip 150 except the resistive region 156 are covered by the metal shied 162, thereby improving the spatial resolution of the resistive tip 150.

Figure 4A:
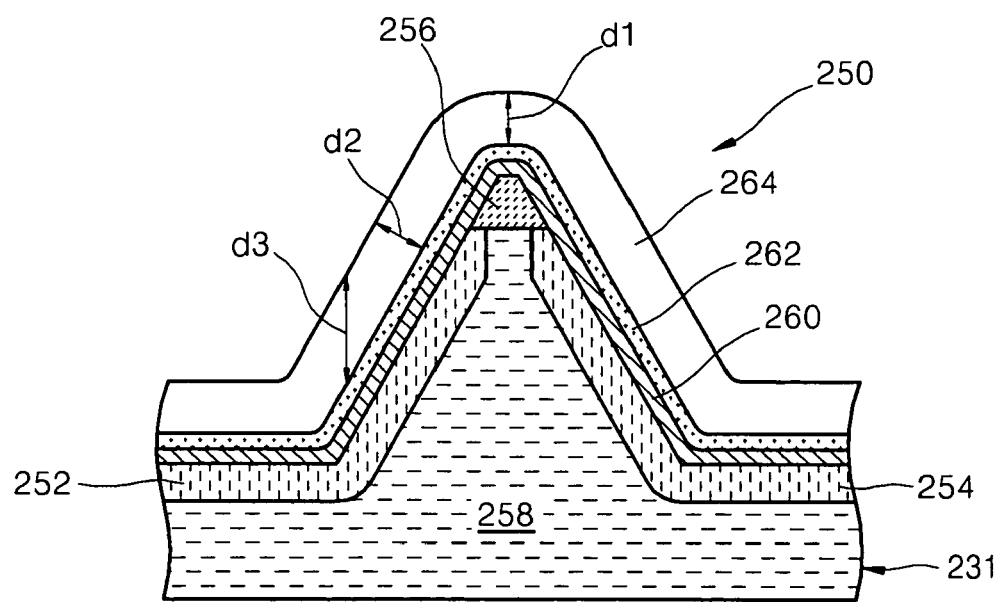
FIGS. 4A through 4C are cross-sectional views for explaining a principle of self-alignment of an aperture of a metal shield with a resistive region.
Figure 4B:
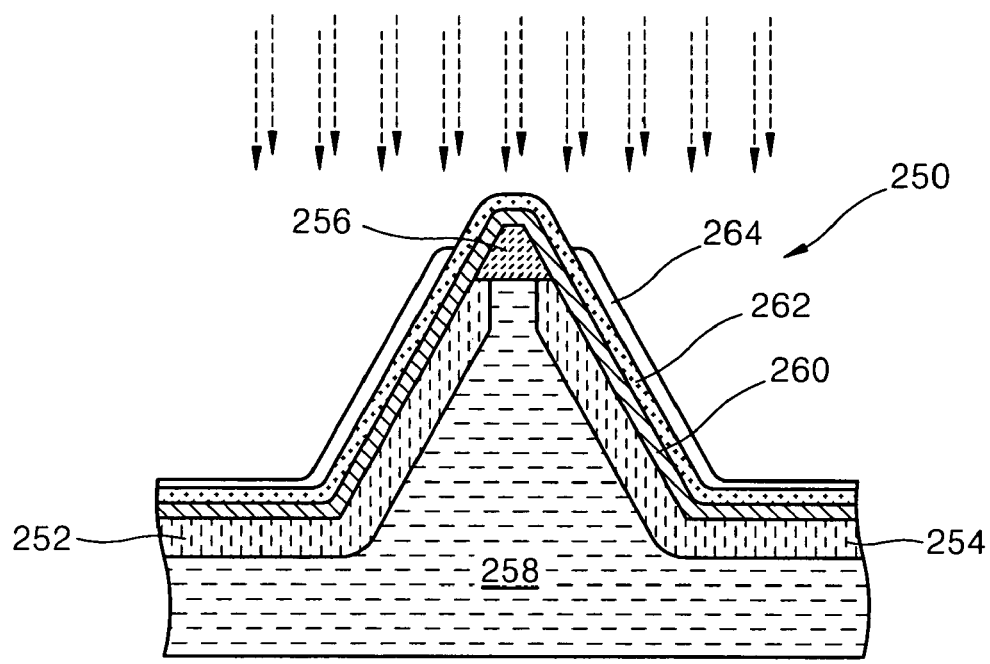
Figure 4C:
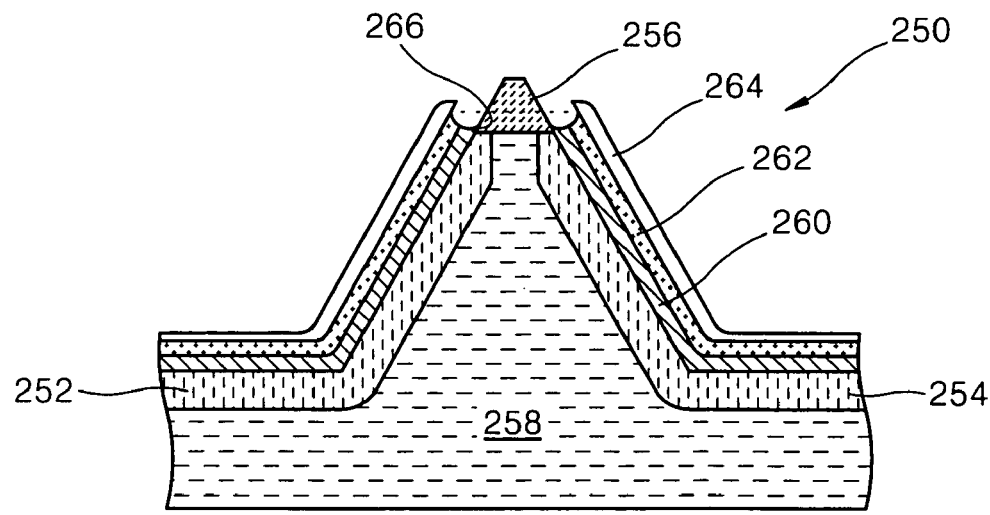

FIGS. 4A through 4C are cross-sectional views for explaining a principle of self-alignment of an aperture of a metal shield with a resistive region.

Referring to FIG. 4A, a resistive tip 250 includes a body 258 doped with a first impurity, a resistive region 256 formed at a peak of the resistive tip 250 and lightly doped with a second impurity, and first and second semiconductor electrode regions 252 and 254 formed on inclined surfaces of the resistive tip 250 and heavily doped with the second impurity. A first insulating layer 260 is deposited on a substrate 231 to cover the resistive tip 250. The first insulating layer 260 may be made of $SiO_2$ or $Si_3N_4$. Next, a metal, for example, aluminium, is deposited or sputtered on the first insulating layer 260 to form a metal shield 262. The metal shield 262 may be deposited to a thickness of approximately 10 to 200 nm. Next, a second insulating layer 264 is formed over the substrate 231 to cover the metal shield 262. The second insulating layer 264 made of $SiO_2$ or $Si_3N_4$ may be deposited on the metal shield 262 using a plasma enhanced chemical vaporized deposition (PE-CVD) method. In FIG. 4A, a thickness d2 may be equal to or greater than a thickness d1. When an acute angle of the resistive tip 250 is 2α, a vertical distance d3 between slopes is given by $$d3 = d2/\cos\alpha \quad (1).$$

Referring to FIG. 4B, the second insulating layer 264 is anisotropically etched to completely remove the second insulating layer 264 in the vicinity of the resistive region 256. If the second insulating layer 264 is etched to a thickness which is greater than d1 and less than d3, the second insulating layer 264 remains only on the inclined surfaces.

Referring to FIG. 4C, when the exposed metal shield 262 is etched using the second insulating layer 264 as a mask, the resistive region 256 is positioned in an aperture 266 of the metal shield 262. This process allows the aperture 266 of the metal shield 262 to be self-aligned with the resistive region 256 without a photolithography process. Also, the size of the aperture 266 can be adjusted by controlling time taken to etch the second insulating layer 262. Next, the first insulating layer 260 exposed by the aperture 266 is etched to expose the resistive region 256.

FIGS. 5A through 5K are schematic views sequentially illustrating a method of fabricating a resistive probe having a self-aligned metal shield according to an exemplary embodiment of the present invention.

Figure 5A:
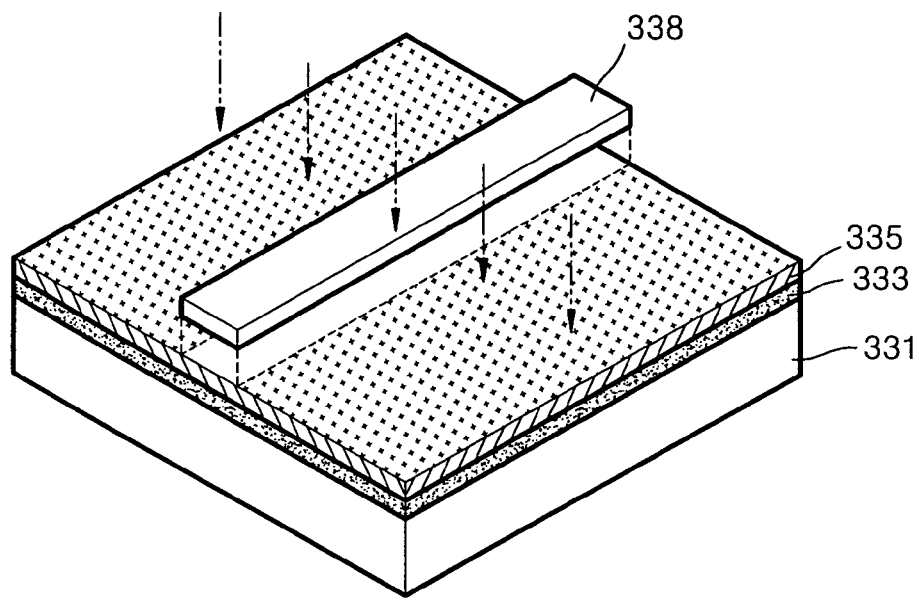
FIGS. 5A through 5K are drawings sequentially illustrating a method of fabricating a resistive probe having a self-aligned metal shield according to an exemplary embodiment of the present invention.

Referring to FIG. 5A, a mask layer 333, such as a silicon oxide layer or a silicon nitride layer, is formed on a surface of a silicon substrate 331 or a silicon-on-insulator substrate, which is doped with a first impurity. A photoresist 335 is coated on a top surface of the mask layer 333, and then a stripe-shaped mask 338 is disposed over the photoresist 335.

Figure 5B:
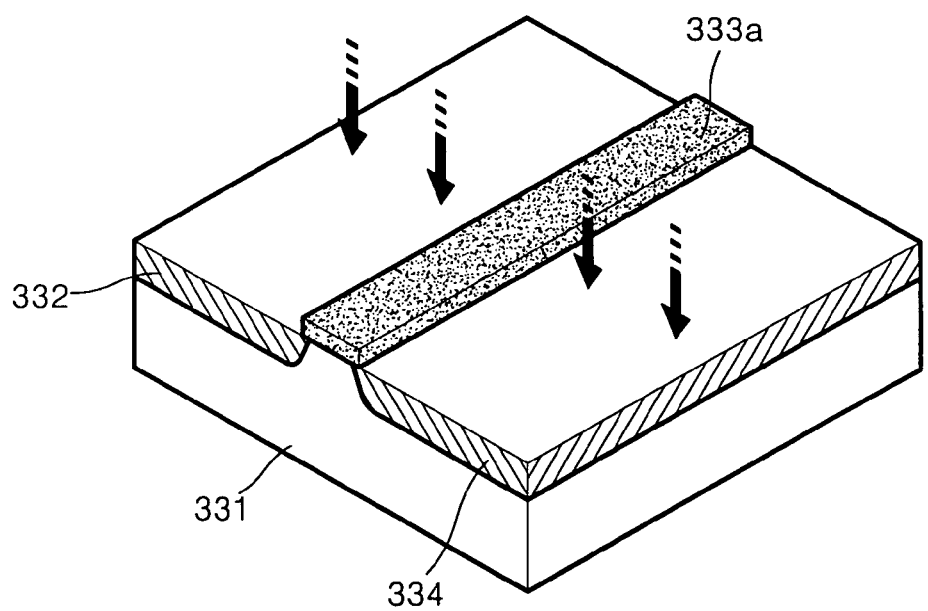

Referring to FIG. 5B, the resultant structure is exposed, developed, and etched to form a stripe-shaped mask layer 333a on the substrate 331. Portions not covered by the mask layer 333 are heavily doped with a second impurity to form first and second semiconductor electrode regions 332 and 334. The resistivity of the first and second semiconductor electrode regions 332 and 334 is so low that they can act as conductors.

Figure 5C:
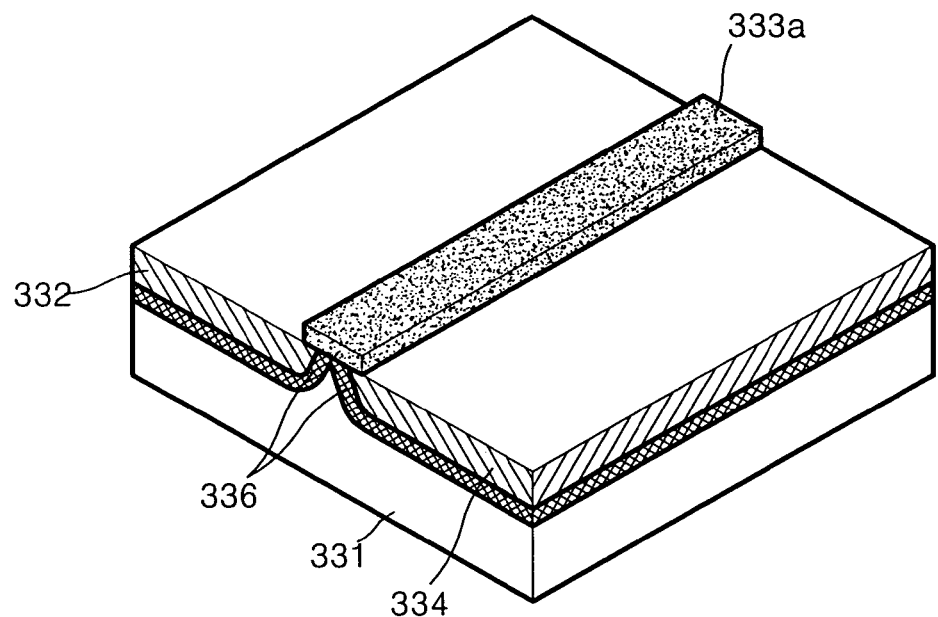

Referring to FIG. 5C, the substrate 331 is annealed to make a width between the first and second semiconductor electrode regions 332 and 334 smaller than the width of the mask layer 333a. When the first and second semiconductor electrode regions 332 and 334 heavily doped with the second impurity expand, the second impurity is diffused to portions contiguous with the first and second semiconductor electrode regions 332 and 334 to form resistive regions 336 that are lightly doped with the second impurity. The resistive regions 336 under the mask layer 333a may contact each other to form a peak forming portion. The contact between the resistive regions 336 may be formed in a thermal oxidation process, which will be explained later.

Figure 5D:
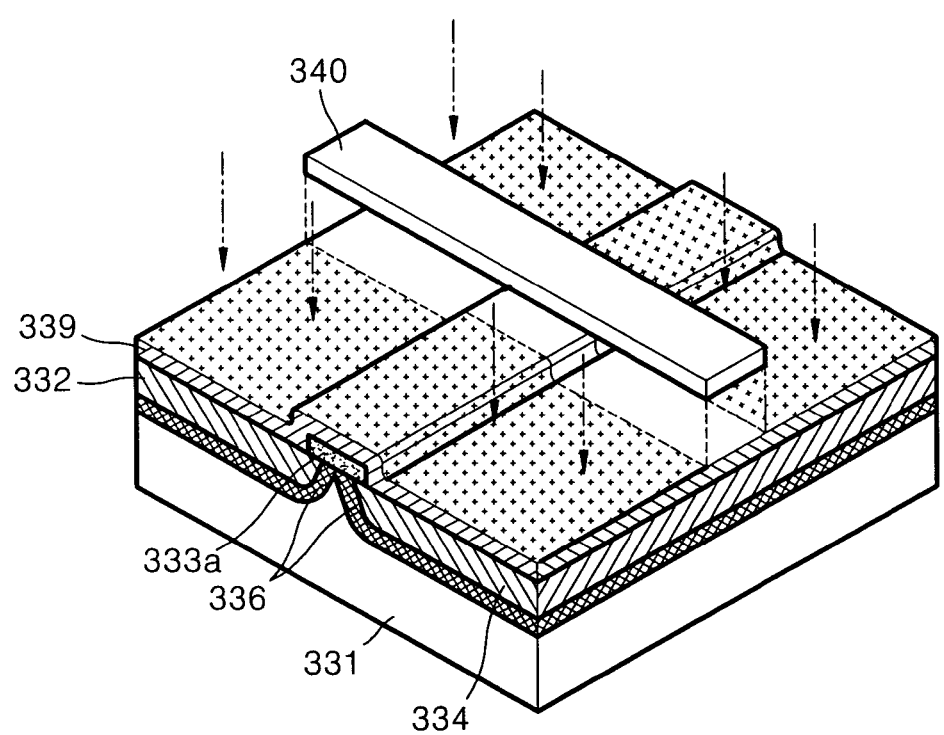
Figure 5E:
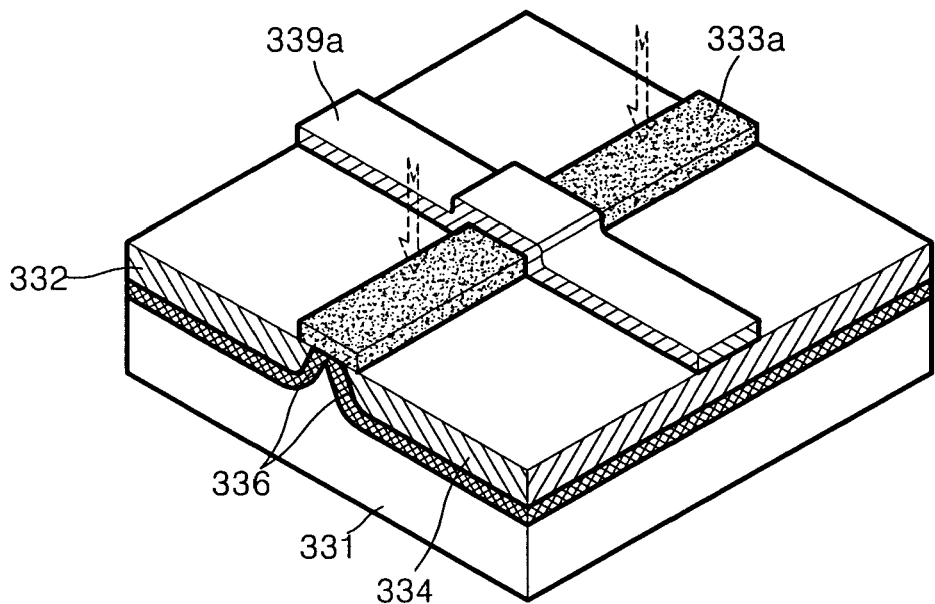

Referring to FIGS. 5D and 5E, a photoresist layer 339 is coated on the top surface of the substrate 331 to cover the mask layer 333a, and then a stripe-shaped photomask 340 is disposed over the photoresist layer 339 to be perpendicular to the mask layer 333a. Next, the resultant structure is exposed, developed, and etched to form a photoresist layer 339a having the same shape as the photomask 340.

Figure 5F:
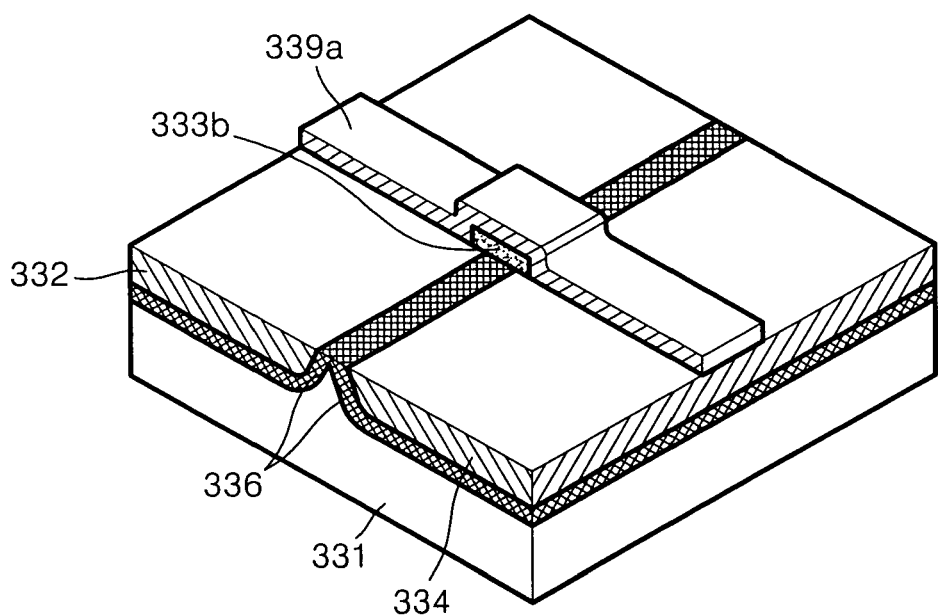

Referring to FIG. 5F, the mask layer 333a not covered by the stripe-shaped photoresist layer 339a is dry etched to form a rectangular mask layer 333b.

Figure 5G:
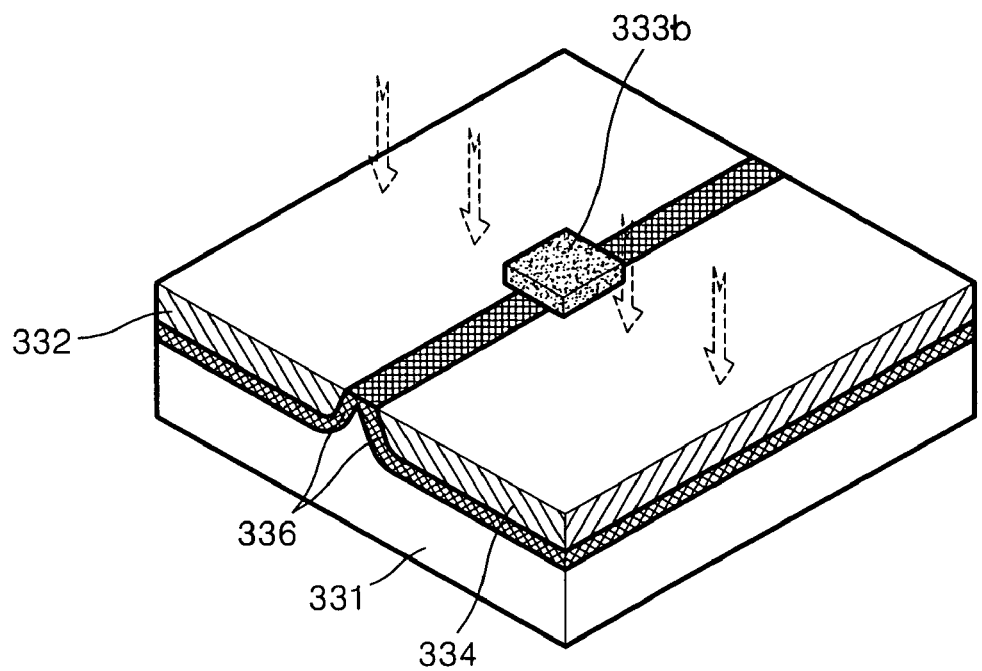

Referring to FIG. 5G, the photoresist layer 339a is removed, and the substrate 331 is wet or dry etched using the rectangular mask layer 333b as a mask.

Figure 5H:
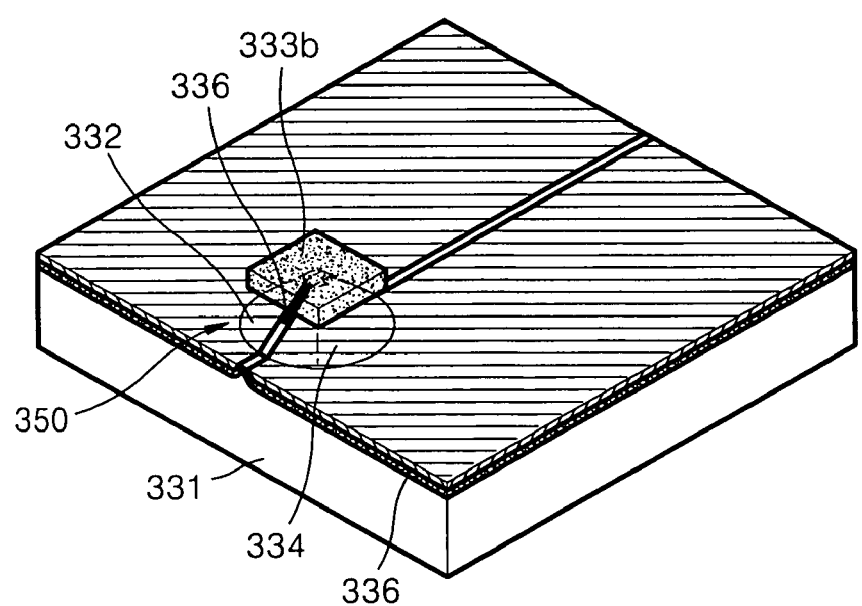

Referring to FIG. 5H, the first and second semiconductor electrode regions 332 and 334 are formed on inclined surfaces of a resistive tip 350, and the resistive regions 336 are aligned at a peak of the resistive tip 350.

Next, the mask layer 333b is removed, and the substrate 331 is heated under an oxygen atmosphere to form a silicon oxide layer (not shown) with a predetermined thickness on the top surface of the substrate 331. The silicon oxide layer is removed to sharpen ends of the resistive regions 336. Through this thermal oxidation process, the resistive tip 350 is sharpened and the resistive regions 336 may contact each other.

Figure 5I:
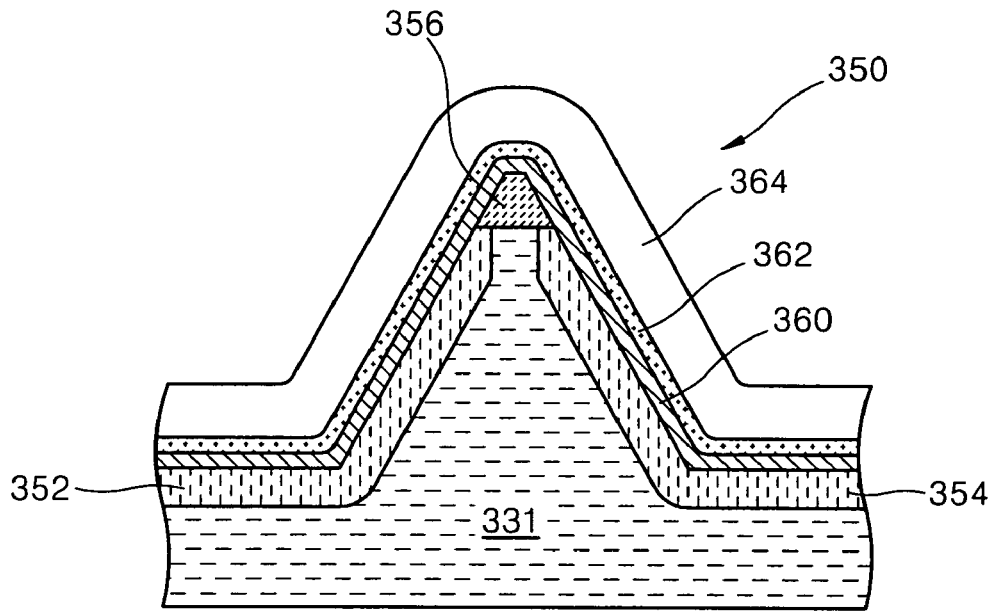

Referring to FIG. 5I, a first insulating layer 360 is deposited on the substrate 331 to cover the resistive tip 350. The first insulating layer 360 may be made of $SiO_2$ or $Si_3N_4$. Next, a metal, for example, aluminium, is deposited or sputtered on the first insulating layer 360 to form a metal shield 362. The metal shield 362 may be deposited to a thickness of approximately 10 to 200 nm. Next, a second insulating layer 364 is formed on the substrate 331 to cover the metal shield 362. The second insulating layer 364 made of $SiO_2$ or $Si_3N_4$ may be deposited on the metal shield 362 using a PE-CVD method. The second insulating layer 364 may be deposited at a temperature of 400° C. or less so as not to deform the metal shield 362.

Figure 5J:
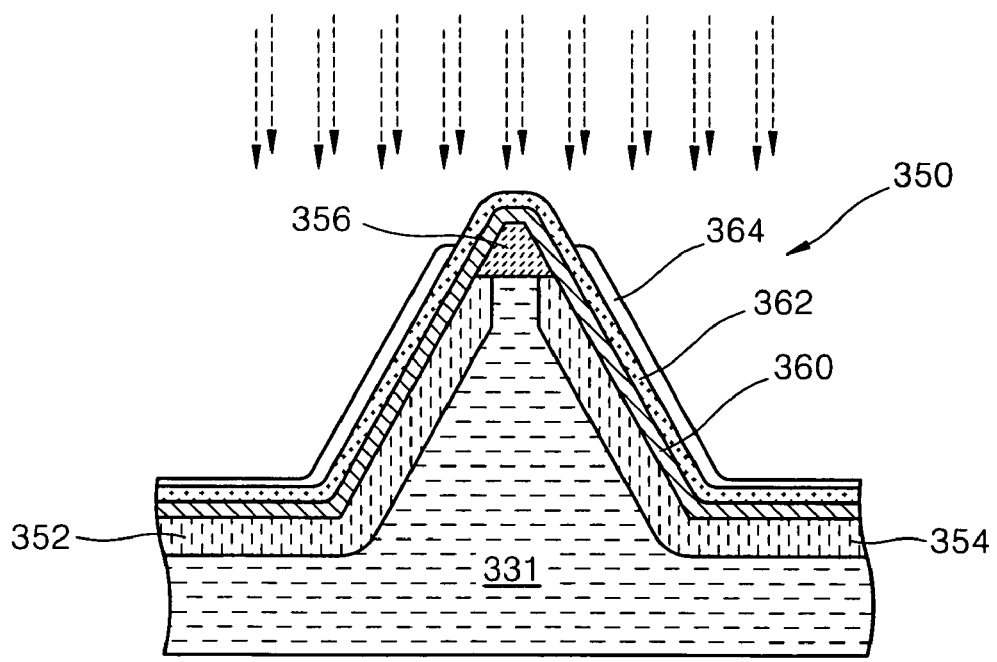

Referring to FIG. 5J, the second insulating layer 364 is anisotropically etched to completely remove the second insulating layer 364 in the vicinity of the resistive region 356, where the second insulating layer 364 has the least thickness. The second insulating layer 364 remains in portions other than the resistive region 356 that is formed at the peak of the resistive tip 30.

Figure 5K:
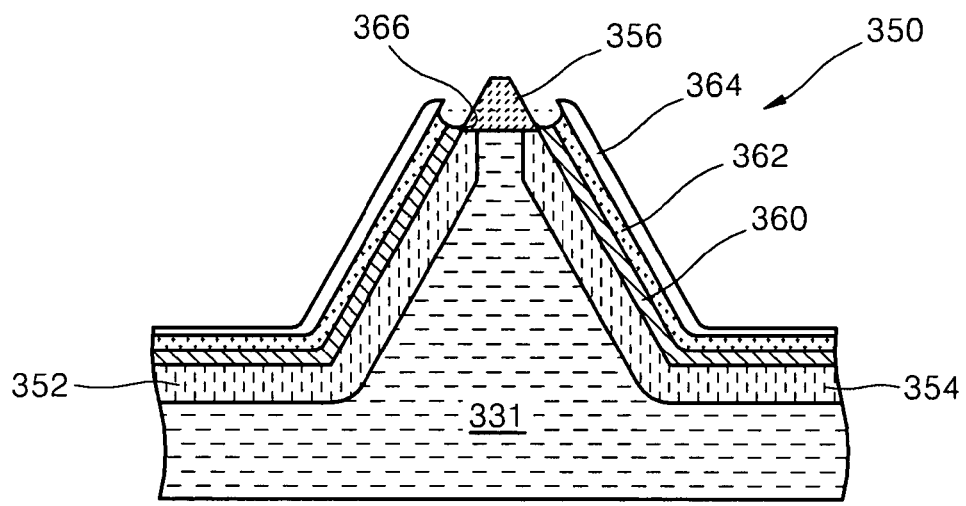

Referring to FIG. 5K, the exposed metal shield 362 is etched using the second insulating layer 364 as a mask, such that the resistive region 356 is disposed in an aperture 366. This process allows the aperture 366 of the metal shield 362 to be self-aligned with the resistive region 356 without a photolithography process. Also, the size of the aperture 366 can be adjusted by controlling time taken to etch the second insulating layer 362. Next, the first insulating layer 360 exposed by the aperture 366 is etched to expose the resistive region 356.

Next, a bottom surface of the substrate 331 is etched to form a cantilever (not shown), such that the resistive tip 350 can be located at an end portion of the cantilever. Electrode pads (not shown) are connected to the first and second semiconductor electrode regions 332 and 334. This cantilever forming process is well known, and thus a detailed explanation thereof will not be given.

Figure 6:
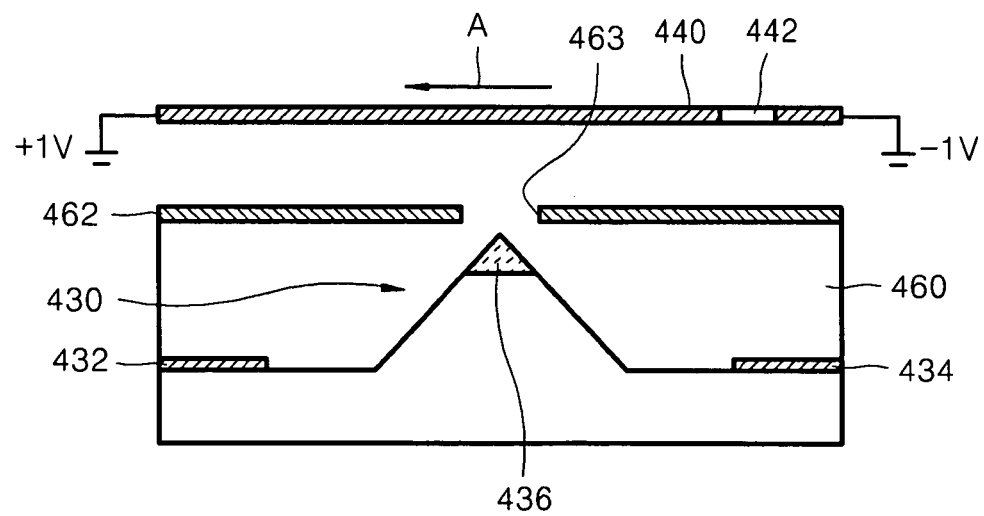
FIG. 6 is a cross-sectional view of a probe used in a simulation to compare resolutions between a resistive probe with a self-aligned metal shield according to an exemplary embodiment of the present invention and a related art probe without a metal shield.
Figure 7:
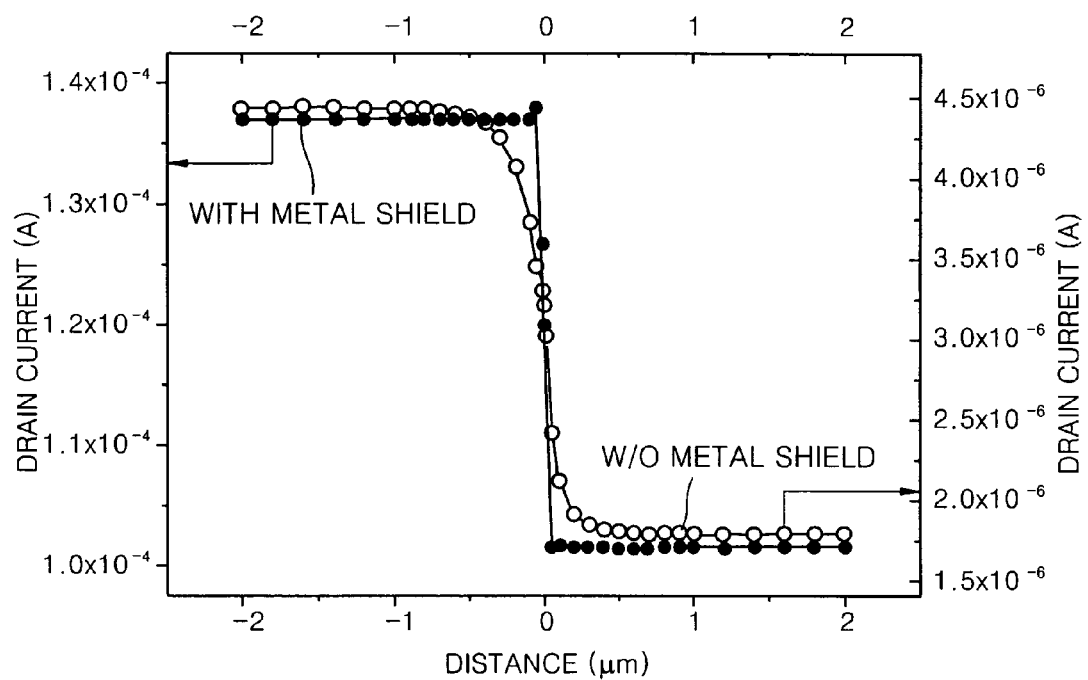
FIG. 7 is a graph illustrating a drain current of the probe of FIG. 6 according to a charge variation.

FIG. 6 is a cross-sectional view of a probe used in a simulation to compare resolutions between a resistive probe with a self-aligned metal shield according to an exemplary embodiment of the present invention and a related art resistive probe without a metal shield. FIG. 7 is a graph illustrating a drain current of the probe of FIG. 6 according to a charge variation.

Referring to FIGS. 6 and 7, source and drain electrodes 432 and 434 were formed on both sides of a resistive tip 430, and a resistive region 436 was formed at a peak of the resistive tip 430. An aperture 463 of the metal shield 462 is formed at the front of the resistive region 436. A metal 440 forming a floating voltage was positioned separately from the resistive tip 430. The diameter of an opening 442 of the metal 440 was 10 nm, and a gap between the metal 440 and the resistive region 436 was 10 nm. The floating voltage applied to the metal 440 varied from +1V to −1V, and a drain current of the resistive tip 430 was calculated by applying the floating voltage in a direction marked by an arrow A. The transition width between the two opposite charges (plus and minus) of the resistive tip according to an exemplary embodiment of the present invention was measured and found to be sharper than that of the related art resistive tip.

The related art resistive tip without the metal shield had a transition width of 112 nm between the two opposite charges (plus and minus), whereas the resistive tip with the metal shield had a very sharp transition width of 23 nm between the opposite charges (plus and minus). It can be seen from the measurement results that the resolution of the resistive tip having the metal shield has improved.

According to the method of fabricating the resistive probe having the self-aligned metal shield, the aperture of the metal shield that exposes the resistive region is self-aligned, making it possible to easily fabricate a high resolution resistive probe.

When the fabricated probe is applied to ultra-small large-capacity information storage devices, a charge existing in a small region can be detected to reproduce information and a charge can be formed in a small region to record information.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of fabricating a resistive probe having a self-aligned metal shield, the method comprising:

forming a resistive tip on a substrate that is doped with a first impurity, the resistive tip comprising a resistive region formed at a peak thereof and lightly doped with a second impurity, which is opposite in polarity to the first impurity, and first and second electrode regions formed on inclined surfaces thereof and heavily doped with the second impurity;

sequentially forming a first insulating layer and a metal shield on the resistive tip;

uniformly forming a second insulating layer to cover the metal shield;

etching the second insulating layer to expose the metal shield on the resistive region;

etching the exposed metal shield; and etching the first insulating layer to expose the resistive region.

2. The method of claim 1, wherein the uniformly forming of the second insulating layer comprises depositing the second insulating layer using a plasma enhanced chemical vaporized deposition (PE-CVD) method.

3. The method of claim 1, wherein the uniformly forming of the second insulating layer comprises depositing the second insulating layer at a temperature of 400° C. or less.

4. The method of claim 1, wherein the etching of the second insulating layer comprises anisotropically etching the second insulating layer such that the second insulating layer remains on the inclined surfaces.

5. The method of claim 1, wherein the forming of the resistive tip on the substrate comprises:

forming a stripe-shaped mask layer on a top surface of the substrate that is doped with the first impurity, and heavily doping a portion of the substrate not covered by the mask layer with the second impurity, which is opposite in polarity to the first impurity, to form the first and second electrode regions;

annealing the substrate to reduce a distance between the first and second electrode regions, and forming a resistive region, which is lightly doped with the second impurity, along outer boundaries of the first and second electrode regions; and patterning the mask layer into a shape and forming a resistive tip by etching the top surface of the substrate except the patterned mask layer.

6. The method of claim 5, wherein the forming of the resistive region comprises forming a peak forming portion by allowing the resistive region diffused from the first and second electrode regions to contact each other.

7. The method of claim 5, wherein the patterning of the mask layer comprises forming a stripe-shaped photoresist perpendicularly to the mask layer, and performing an etching process to make the mask layer into a rectangular shape.

8. The method of claim 5, wherein the forming of the resistive tip comprises:

forming an oxide layer with a thickness on the surface of the substrate by annealing the substrate under an oxygen atmosphere after removing the patterned mask layer; and removing the oxide layer to sharpen ends of the resistive regions.

9. The method of claim 8, wherein the forming of the oxide layer comprises forming a peak forming portion by allowing the resistive regions diffused from the first and second electrode regions to contact each other on the substrate.

10. The method of claim 1, wherein the first impurity is a p-type impurity, and the second impurity is an n-type impurity.

* * * * *